United States Patent
Seiler et al.

(10) Patent No.: US 9,596,598 B2
(45) Date of Patent: *Mar. 14, 2017

(54) REDUCING DETECTABILITY OF AN ENCRYPTION KEY

(71) Applicant: Swisscom AG, Bern (CH)

(72) Inventors: Thomas Seiler, Rizenbach (CH); Andreas Jarosch, Allenwinden (CH)

(73) Assignee: SWISSCOM AG, Bern (CH)

( * ) Notice: Subject to any disclaimer, the term of this patent is extended or adjusted under 35 U.S.C. 154(b) by 186 days.

This patent is subject to a terminal disclaimer.

(21) Appl. No.: 14/313,576

(22) Filed: Jun. 24, 2014

(65) Prior Publication Data

US 2015/0003610 A1 Jan. 1, 2015

Related U.S. Application Data

(63) Continuation of application No. 13/337,687, filed on Dec. 27, 2011, now Pat. No. 8,761,395.

(30) Foreign Application Priority Data

Aug. 25, 2011 (EP) .................................... 11178913

(51) Int. Cl.
*H04K 1/00* (2006.01)
*H04W 12/04* (2009.01)
(Continued)

(52) U.S. Cl.
CPC ............ *H04W 12/04* (2013.01); *H04L 9/002* (2013.01); *H04L 9/065* (2013.01); *H04L 9/30* (2013.01);
(Continued)

(58) Field of Classification Search
CPC ........................................................ H04K 1/00
(Continued)

(56) References Cited

U.S. PATENT DOCUMENTS

| 2006/0126841 | A1 | 6/2006 | Pal et al. | |
| 2008/0019523 | A1* | 1/2008 | Fuse et al. | 380/256 |
| 2012/0079346 | A1* | 3/2012 | Fukuda | H03M 13/01 |
| | | | | 714/758 |

FOREIGN PATENT DOCUMENTS

| EP | 2009241 | 12/2008 |
| JP | 2002077135 | 3/2002 |

OTHER PUBLICATIONS

Van Den Brock, Fabian, "Eavesdropping on GSM: state of affairs", Radbound University, Nijmegen, Institute for Computing and Information Sciences (iCIS), XP55019362, Mar. 1, 2011. (16 pages).
(Continued)

*Primary Examiner* — Jacob Lipman
(74) *Attorney, Agent, or Firm* — McAndrews, Held & Malloy, Ltd.

(57) ABSTRACT

Methods and systems are provided for reducing detectability of encryption keys, which may be used to encrypt messages transmitted in a network (e.g., between a base station and a mobile station, such as over the air). Random bit errors may be introduced into the messages to artificially lowering transmission quality, thus makes it harder to detect the encryption key from well-known messages. The random bit errors may be introduced by inverting one or more randomly selected bits in the encrypted message prior to transmitting.

16 Claims, 2 Drawing Sheets

(51) Int. Cl.
| | |
|---|---|
| *H04L 29/06* | (2006.01) |
| *H04W 12/02* | (2009.01) |
| *H04L 9/00* | (2006.01) |
| *H04L 9/06* | (2006.01) |
| *H04L 9/30* | (2006.01) |
| H04W 80/02 | (2009.01) |
| H04W 84/04 | (2009.01) |

(52) U.S. Cl.
CPC ...... *H04L 63/0457* (2013.01); *H04L 63/1441* (2013.01); *H04W 12/02* (2013.01); *H04L 2209/16* (2013.01); *H04L 2209/24* (2013.01); *H04L 2209/80* (2013.01); *H04W 80/02* (2013.01); *H04W 84/042* (2013.01)

(58) Field of Classification Search
USPC .......................................................... 380/270
See application file for complete search history.

(56) References Cited

OTHER PUBLICATIONS

European Office Action for EP 11178913.7, dated Feb. 13, 2015, 5 pages.
David Tse and Pramod Viswanath, "Fundamentals of Wireless Communication", Cambridge University Press, 2005, p. 49, Chapter 3.
"BER Bit Error Rate Tutorial and Definition", http://www.radio-electronics.com/info/rf-technology-design/ber/bit-error-rate-tutorial-definition.php. dated Feb. 5, 2015, 5 pages.

* cited by examiner

REDUCING DETECTABILITY OF AN ENCRYPTION KEY

CLAIM OF PRIORITY AND CROSS-REFERENCE TO RELATED APPLICATIONS/INCORPORATION BY REFERENCE

This application is a continuation of U.S. patent application Ser. No. 13/337,687, filed on Dec. 27, 2011, which in turn claims the benefit of priority from prior European (EP) Application No. 11178913.7, filed on Aug. 25, 2011.

Each of the above identified applications is hereby incorporated herein by reference in its entirety.

FEDERALLY SPONSORED RESEARCH OR DEVELOPMENT

[Not Applicable].

MICROFICHE/COPYRIGHT REFERENCE

[Not Applicable].

FIELD OF THE INVENTION

The present invention relates to a method and devices for reducing detectability of an encryption key used in a communication network. Specifically, the present invention relates to a method and devices for reducing detectability of an encryption key used in a communication network to encrypt messages transmitted over the air between a base station and a mobile station.

BACKGROUND OF THE INVENTION $2^{nd}$ generation mobile radio networks, specifically GSM networks (Global System for Mobile Communications), were designed during the cold war, and cryptography was considered a weapon. Therefore, the cryptography used in GSM was deliberately designed to be weak enough so that government agencies could decipher it for reasons of national or international security. Particularly, for its security, GSM has relied for a long time on the fact that the equipment for eavesdropping communication traffic and detecting encryption keys has been too expensive for "normal" hackers. However, the hacking community has recently demonstrated cheap and efficient attacks on the GSM A5/1 ciphering algorithm used in today's GSM networks. As described by Harald Welte in "A real-world practical A5/1 attach using airprobe and Kraken" (http://laforge.gnumonks.org/weblog/2010/07/30/#20100730-practical gsm a51 attack), the attack on the A5/1 ciphering algorithm, which is presently used widely in GSM networks, relies on the fact that there are well known messages, e.g. signaling or control messages, sent over the network which are encrypted using a rather short encryption key. Capturing such a well-known message makes it possible for an eavesdropper to detect the encryption key quite quickly by looking up the key in a pre-computed dictionary. One mitigation technique for this problem is known as "random padding" and described in ETSI, "Digital cellular telecommunications system (Phase 2+); Mobile Station-Base Stations System (MS-BSS) interface Data Link (DL) layer specification," 3GPP TS 44.006 version 9.1.0 Release 9. However, "random padding" does not prevent the attack for well-known messages which do not allow padding, such as a location update message, for example.

European Patent EP 2,099,241 describes a method for improving the level of security in GSM networks which implement the A5/1 ciphering protocol. For making it more difficult for an attacker to decipher A5/1 GSM communication, EP 2 099 241 makes reference to randomizing "dummy bits" included in a call, whereby 15 "dummy bits" are defined as bits with pre-defined values reserved for future applications by the protocol. Nevertheless, as in the case of "random padding" the method of EP 2,099,241 relies on, and is limited to, specific bits that may be present or may not be present, and whose positions in a message are defined and also known to a malicious attacker.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for reducing detectability of an encryption key, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

BRIEF DESCRIPTION OF THE DRAWINGS

Various features and advantages of the invention will become apparent from the following description of non-limiting exemplary embodiments, with reference to the appended drawings, in which.

DETAILED DESCRIPTION OF THE INVENTION

Figure 1:
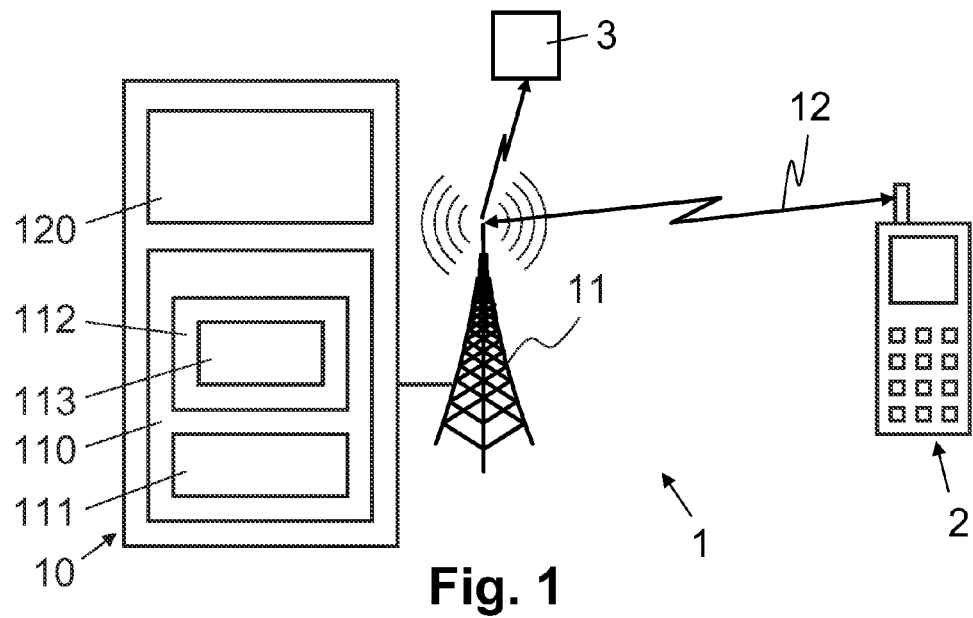
FIG. 1 shows a block diagram illustrating schematically an exemplary communication network comprising a base transceiver station for transmitting messages via the air to mobile stations, which may be used in accordance with the invention.

Certain embodiments of the present invention may be found in a method and system for reducing detectability of an encryption key, as described in the following in more detail with reference to the attached figures. Aspects of the present invention enable a method and devices for reducing detectability of an encryption key used for encrypting messages transmitted over the air. In particular, in an exemplary embodiment of the present invention, a method and devices for reducing detectability of an encryption key used for encrypting messages transmitted over the air are provided, which—that is the method and devices—are not limited to random padding of a message or randomizing reserved bits of the message.

According to exemplary embodiment of the present invention, for reducing detectability of an encryption key used in a communication network to encrypt messages transmitted over the air between a base station and a mobile station, e.g. known control or signaling messages, one or more selected bits are determined in each case at random positions in the messages, e.g. at the physical layer, and random bit errors are generated in the messages in each case by inverting the selected bits, prior to transmitting the message over the air. Introducing random bit errors into the messages corresponds to artificially lowering transmission quality, which makes it harder for an eavesdropper to obtain error free—and thus recognizable—samples of messages in the signalization channel. Thus, it is more difficult for an attacker to detect the encryption key by looking up well known messages in a predefined dictionary, whereas a legitimate receiver may correct the random bit errors by using conventional forward error correction features. As the random bit errors are not limited to a few reserved bits or known padding bits, there is a much greater variety and more opportunity to make messages deviate from their known content. Consequently, various embodiments of the invention provide a reduced detectability of the used encryption key compared to the prior art. In one embodiment, the messages are physical layer data frames encoding data link layer 5 control frames, and the selected bits are determined at random positions in the physical layer data frame.

In an embodiment of the present invention, the selected bits are determined so that the messages contain in each case at least one random bit error within any sequence of consecutive bits having a length equal to a defined threshold value. For example, the detectability of the encryption key used in a GSM network to encrypt the messages at the base station using an A5/1 cipher protocol is reduced, and the selected bits are determined by the base station at random positions in physical layer data frames encoding data link layer control frames.

In addition to the method for reducing detectability of an encryption key used for encrypting messages transmitted over the air, aspects of the present invention also relate to a communication device for a communication network, where the device comprises an encryption module operable or configured to encrypt messages using an encryption key prior to transmitting the messages over the air, a randomizing module operable or configured to determine in the messages in each case one or more selected bits at random positions in the message, and an error generator operable or configured to generate in the messages in each case random bit errors by inverting the selected bits, prior to transmitting the message over the air. Implementing the error generator and the randomizing module in the base station transceivers of the communication network has an advantage that the detectability of the encryption key can be reduced for attackers eavesdropping at the base transceiver station, without having to implement cryptography modifications or other protocol changes in the mobile stations, or in other parts of the communication network, although the invention is not necessarily so limited. In addition to the method and communication device for reducing detectability of an encryption key used for encrypting messages transmitted over the air, aspects of the present invention also relate to a computer program product comprising computer program code for controlling one or more processors of a communication device, where the computer program product comprises a tangible, non-volatile, and computer-readable medium having the computer program code stored thereon.

FIG. 1 shows a block diagram illustrating schematically an exemplary communication network comprising a base transceiver station for transmitting messages via the air to mobile stations, which may be used in accordance with the invention. In FIG. 1, there is shown a communication network, which may comprise a mobile radio network operable or configured to transmit messages between communication devices over the air, such as via a radio frequency interface 12.

Specifically, the communication network 1 may comprise a base transceiver station 10 with an antenna 11 and one or more mobile stations 2. In this regard, the base transceiver station 10 may comprise suitable logic, circuitry, interfaces, and/or code that may be operable to implement various aspects of the present invention. The base transceiver station 10 may be operable or configured to transmit and receive messages to and from the mobile stations 2 via radio frequency. For example, the communication network 1 may be a cellular network, such as a GSM network for example, comprising a plurality of cells receiving radio frequency coverage from the transceiver base station 10. The invention is not necessarily so limited, however. In an alternative embodiment, the communication network 1 may implemented as, for example, a WLAN (wireless local area network, e.g. according to IEEE 802.11).

Each of the mobile stations 2 may comprise suitable logic, circuitry, interfaces, and/or code that may be operable to implement various aspects of the present invention. The mobile stations 2 may be, for example, mobile communication terminals such as mobile radio phones, mobile computers, or other mobile communication devices operable or configured to exchange messages via the radio frequency interface 12 and the base transceiver station 10. The base transceiver station 10 comprises one or more operable computers with one or more processors, and data and program memory. As illustrated schematically in FIG. 1, the base transceiver station 10 further comprises various functional modules associated with different protocol layers, as defined by the Open System for Interconnection (OSI) Reference Model, for example. The functional modules may include an encryption module 111, an error generator 112, and a randomizing module 113 associated with the physical layer 110. The functional modules may be implemented by way of programmed software modules comprising computer program code, running within in the base transceiver station 10 to control the processor(s) of the base transceiver station 10. The computer program code is stored on a computer readable medium that is operably connected in a fixed or removable fashion to the processor(s). In alternative embodiments, the functional modules can be implemented partly or fully by way of hardware components. The functional modules 111, 112 and 113 may be utilized during operations of the base transceiver station 10 to reduce detectability of an encryption key used for encrypting messages transmitted over the air.

The radio frequency interface 12 between the mobile station 2 and base transceiver station 10 may be a Um interface, which is used in GSM networks and defined in the GSM 04.xx and 05.xx series of specifications. Following the OSI Reference Model, the Um interface is defined by a corresponding physical layer, data link layer, and network layer. Accordingly, the physical layer 110 is implemented as a Um physical layer used in GSM networks and defined in the GSM 05.xx series of specifications, with the introduction and overview in GSM 05.01, and the data link layer 120 is implemented as an LAPDm (Link Access Procedure on channel Dm) data link layer protocol used in GSM networks and defined in GSM 04.05 and 04.06. Furthermore, in this example, the encryption module 111 is configured to implement the A5/1 cipher protocol used in GSM networks.

In an embodiment of the invention, the base transceiver station 10 may be operable or configured to reduce detectability of an encryption key used for encrypting messages transmitted over the air, to and/or from the mobile stations 2. In the following paragraphs, described with reference to FIG. 2, are possible sequences of steps performed by the functional modules for reducing detectability by an eavesdropper 3 of the secret encryption key used by the encryption module 111 for encrypting the messages exchanged between the base transceiver station 10 and the mobile station 2 over the radio frequency interface 12.

Figure 2:
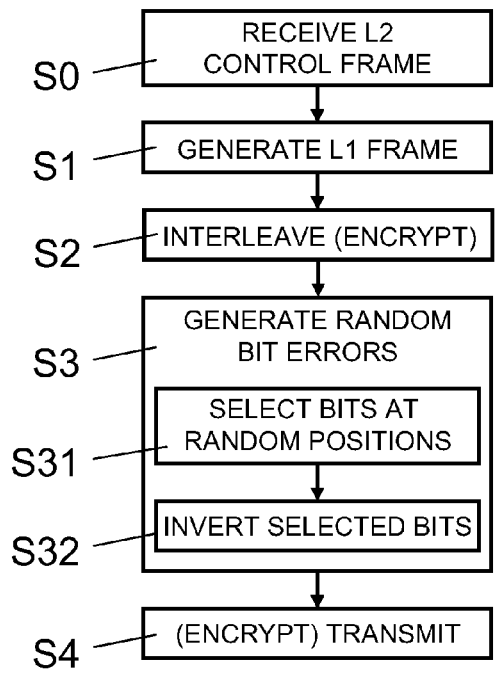
FIG. 2 shows a flow diagram illustrating an exemplary sequence of steps for reducing detectability of an encryption key used in a communication network to encrypt messages transmitted over the air between a base station and a mobile station.
Figure 3:
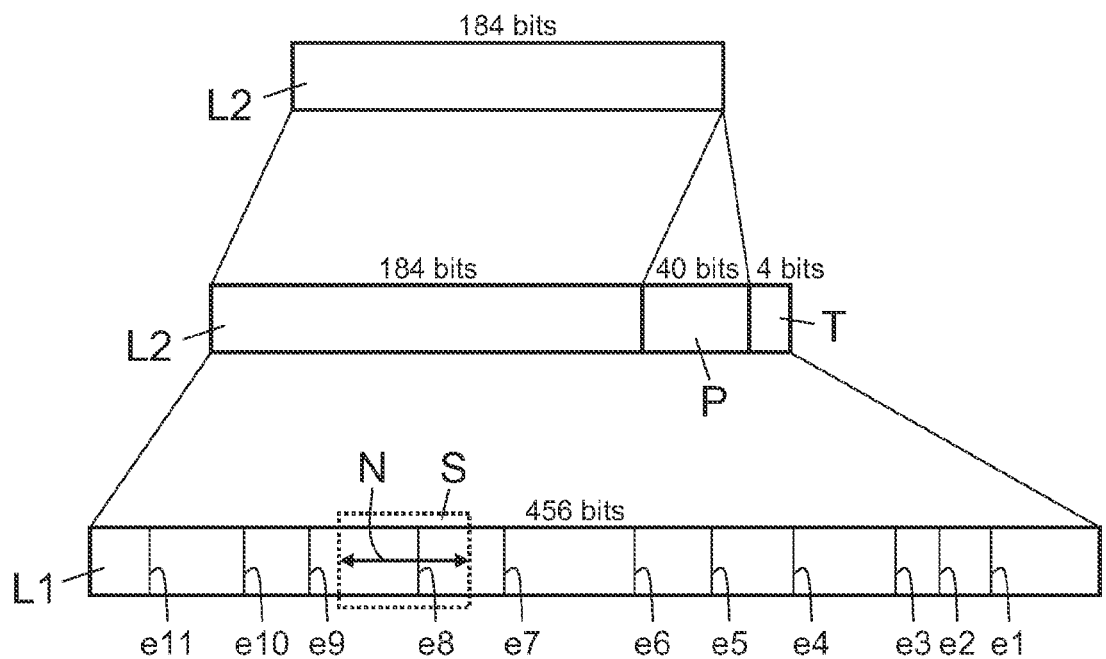
FIG. 3 shows a block diagram illustrating schematically the exemplary coding of a data link layer control frame into a physical layer data frame.

FIG. 2 shows a flow diagram illustrating an exemplary sequence of steps for reducing detectability of an encryption key used in a communication network to encrypt messages transmitted over the air between a base station and a mobile station. In step S0, the physical layer 110 receives from the data link layer 120 a signaling or control message. Specifically, in step S0, a data link layer control frame L2 is received from the data link layer 120 at the physical layer 110. As illustrated in FIG. 3, in the example of GSM networks, the data link layer control frame L2 comprises 184 bits.

In step S1, the signaling or control message is coded into a transmittable data message at the physical layer 110. Specifically, at the physical layer 110, the data link layer control frame L2 is coded into a physical layer data frame L1. As illustrated in FIG. 3, in the example of GSM networks, the physical layer data frame L1 comprises 456 bits. In the encoding of the data link layer control frame L2, a coding sublayer of the physical layer 110 provides coding for forward error correction (FEC). As illustrated in FIG. 3, in the example of GSM networks, 40 parity bits P and 4 additional trailing bits T are appended to the 184 bits of the data link layer control frame L2.

In step S2, in the example of GSM networks, the physical layer data frame L1 is interleaved. Depending on the embodiment, the physical layer data frame L1 may be encrypted at this stage or at a later phase, such as during step S4.

In step S3, the error generator 112 generates random bit errors in the (interleaved) physical layer data frame L1. Specifically, in step S31, the randomizing module 113 selects one or more bits, such as bits e1, e2, e3, e4, e5, e6, e7, e8, e9, e10, e11 (e1-e11) in the (interleaved) physical layer data frame L1, at random positions.

Subsequently, in step S32, the error generator 112 inverts the selected bit(s) e1-e11. In this regard, during bit inversion, a bit having a value of one will be set to a value of zero, whereas a bit having a value of zero will be set to a value of one. In other words, in the example of GSM networks, the randomizing module 113 randomly selects any of the 456 bits of the physical layer data frame L1, without limiting this selection to reserved bits or padding bits, and generates an artificial transmission error by inverting the value of the randomly selected bit(s) e1-e11.

For determining a true random value for the random positions of the bits to invert, the randomizing module 113 uses noise (e.g. atmospheric, thermic or signal noise), detected for example at a radio receiver of the base transceiver station 10, or another (true) random number generator or source, such as HotBits (www.fourmilab.ch/hotbits).

The selected bits e1-e11, and thus the random bit errors, are determined so that there is no error-free sequence S of consecutive bits having a length greater than or equal to a defined threshold value N. For example, in GSM networks, the maximum length of an error-free bit sequence S in the physical layer data frame L1 is set to N<64, e.g. to N=63. The smaller the value of N, the more the transmission quality is lowered artificially. Depending on the embodiment, this is achieved, for example, by increasing the number of random bit errors, until at least one random bit error is within any sequence S of consecutive bits having a length equal to the defined threshold value N. To limit the total number of random bit errors to a defined maximum value, which still can be recovered at the receiving station through forward error correction features, without degradation of transmission quality, the randomizing module 113 may ignore random bit positions that are not required to meet the threshold criteria on the maximum length N of an error-free sequence S. In an alternative embodiment, the message is split into blocks of length N and in each block at least one bit is flipped randomly.

In step S4, the encrypted physical layer data frame L1 with the random bit errors is transmitted over the air to a receiving communication device. In the example of GSM networks, the physical layer data frame L1 is encrypted, e.g. at step S2 or at step S4, using the cipher protocol A5/1, before the transmission by a radio modem of the physical layer 110. For example, in GSM networks, the transmission is organized as sequences of bursts; typically, four bursts containing each 114 bits of information of the interleaved and encrypted physical layer data frame L1.

At the receiving communication device, the random bit errors introduced by the error generator 112 are corrected by way of conventional forward error correction features.

Preferably, the steps S0, S1, S3, and S4 are executed at the base transceiver station 10 by the respective functional modules, as described above, for data link layer control frame L2 messages transmitted from the base transceiver station 10 to the mobile station 2. In a further embodiment, the error generator 112 can be implemented in mobile stations 2 so that steps S0, S1, S3, and S4 are executed by the mobile stations 2 for data link layer control frame L2 messages transmitted from the mobile station 2 to the base transceiver station 10.

It should also be noted that, while the computer program code has been associated with specific functional modules and the sequence of the steps has been presented in a specific order in the description, it should be understood that the computer program code may be structured differently and that the order of at least some of the steps could be altered, without deviating from the scope of the invention.

While the invention has been illustrated and described in detail in the drawings and foregoing description, such illustration and description are to be considered illustrative or exemplary and not restrictive, the invention being not limited to the disclosed embodiment. Other embodiments and variants are understood, and can be achieved by those skilled in the art when carrying out the claimed invention, based on a study of the drawings, the disclosure and the appended claims.

In the claims, the word "comprising" does not exclude other units or steps, and the indefinite article "a" or "an" does not exclude a plurality. A single processor or other unit may fulfil the functions of several items recited in the claims. The mere fact that different features are recited in mutually different dependent claims does not indicate that a combination of these features cannot be advantageously used. Any reference signs in the claims should not be construed as limiting the scope of the invention.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein.

Accordingly, the present invention may be realized in hardware, software, or a combination of hardware and software. The present invention may be realized in a centralized fashion in at least one computer system, or in a distributed fashion where different units are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method of reducing detectability of an encryption key used to encrypt a message, the method comprising:
   selecting one or more bits in an encrypted message; and
   inverting the one or more selected bits in the encrypted message prior to transmitting to introduce random bit errors;
   wherein the one or more bits are selected such that in the message there is no sequence of consecutive bits, having a length that is greater than or equal to a defined threshold value, that is free of bit errors.

2. The method of claim 1, wherein the one or more selected bits are determined at a physical layer.

3. The method of claim 1, wherein the message is a known control message.

4. The method of claim 1, wherein:
   the message is a physical layer data frame encoding a data link layer control frame, and
   the one or more selected bits are determined at random positions in the physical layer data frame.

5. The method of claim 1, wherein the one or more selected bits are corrected at a receiver-side device by use of forward error correction.

6. The method of claim 1, wherein:
   inverting one or more selected bits in the encrypted message reduces detectability of an encryption key used in a GSM network to encrypt messages at a base station that uses an A5/1 cipher protocol; and
   the one or more selected bits are determined by the base station at random positions in a physical layer data frame encoding a data link layer control frames.

7. The method of claim 1, comprising determining the one or more selected bits so that the message contains at least one random bit error within any sequence of consecutive bits having a particular length.

8. The method of claim 7, comprising adjusting the particular length based on a desired lowered quality of transmission.

9. A system to reduce detectability of an encryption key used to encrypt a message in a communication device, the system comprising:
   one or more circuits for use in the communication device, the one or more circuits being operable to:
   select one or more bits in an encrypted message; and
   invert the one or more selected bits in the encrypted message prior to transmitting to introduce random bit errors
   wherein the one or more bits are selected such that in the message there is no sequence of consecutive bits, having a length that is greater than or equal to a defined threshold value, that is free of bit errors.

10. The system of claim 9, wherein the one or more circuits are operable to determine the one or more selected bits at a physical layer.

11. The system of claim 9, wherein the message is a known control message.

12. The system of claim 9, wherein:
   the message is a physical layer data frame encoding a data link layer control frame; and
   the one or more circuits are operable to determine the one or more selected bits at random positions in the physical layer data frame.

13. The system of claim 9, wherein the one or more selected bits are corrected at a receiver-side device by use of forward error correction.

14. The system of claim 9, wherein:
   the communication device comprises a base station that is configurable to use an A5/1 cipher protocol;
   inverting one or more selected bits in the encrypted message reduces detectability of an encryption key used in a GSM network, associated with the base station, to encrypt messages; and
   the one or more circuits are operable to determine the one or more selected bits at random positions in a physical layer data frame encoding a data link layer control frames.

15. The system of claim 9, wherein the one or more circuits are operable to determine the one or more selected bits so that the message contains at least one random bit error within any sequence of consecutive bits having a particular length.

16. The system of claim 15, wherein the one or more circuits are operable to adjust the particular length based on a desired lowered quality of transmission.

* * * * *